United States Patent
Koyama

(10) Patent No.: US 11,842,047 B2
(45) Date of Patent: Dec. 12, 2023

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Kenji Koyama, Yokhama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 91 days.

(21) Appl. No.: 17/691,783

(22) Filed: Mar. 10, 2022

(65) Prior Publication Data

US 2023/0092423 A1    Mar. 23, 2023

(30) Foreign Application Priority Data

Sep. 17, 2021   (JP) .................................. 2021-152214

(51) Int. Cl.
*G11B 19/20*  (2006.01)
*G06F 3/06*   (2006.01)

(52) U.S. Cl.
CPC .......... *G06F 3/0607* (2013.01); *G06F 3/0658* (2013.01); *G06F 3/0676* (2013.01); *G11B 19/20* (2013.01)

(58) Field of Classification Search
None
See application file for complete search history.

(56) References Cited

U.S. PATENT DOCUMENTS

| | | | |
|---|---|---|---|
| 6,957,291 B2 * | 10/2005 | Moon .................... | G06F 3/0664 369/30.01 |
| 8,767,354 B1 | 7/2014 | Ferris et al. | |
| 9,778,862 B2 | 10/2017 | Yeh | |
| 10,643,668 B1 * | 5/2020 | Poudyal ............. | G11B 20/1889 |
| 2002/0144044 A1 * | 10/2002 | Moon .................... | G06F 3/0689 710/302 |
| 2011/0228651 A1 * | 9/2011 | Gage ..................... | G11B 5/4866 |
| 2011/0228652 A1 * | 9/2011 | Gage ..................... | G11B 5/4866 369/13.26 |
| 2023/0092423 A1 * | 3/2023 | Koyama ............... | G06F 3/0676 360/31 |

FOREIGN PATENT DOCUMENTS

| | | |
|---|---|---|
| JP | H9-16338 A | 1/1997 |
| JP | 5622289 B2 | 11/2014 |

* cited by examiner

*Primary Examiner* — Peter Vincent Agustin
(74) *Attorney, Agent, or Firm* — Allen & Overy LLP

(57) ABSTRACT

According to one embodiment, a magnetic disk device includes a power supply, a magnetic disk, a magnetic head, a communication unit that is communicable with a host computer and transmits a signal to the host computer at a first interval, a power supply monitor, a volatile memory that stores data related to read/write processing on the magnetic disk by the magnetic head, a non-volatile memory, and a controller that controls the communication unit to start processing of backing up the data stored in the volatile memory to the non-volatile memory and transmit the signal at a second interval longer than the first interval if power supplied from the power supply is detected to be disconnected based on monitoring of the power supply monitor.

10 Claims, 2 Drawing Sheets

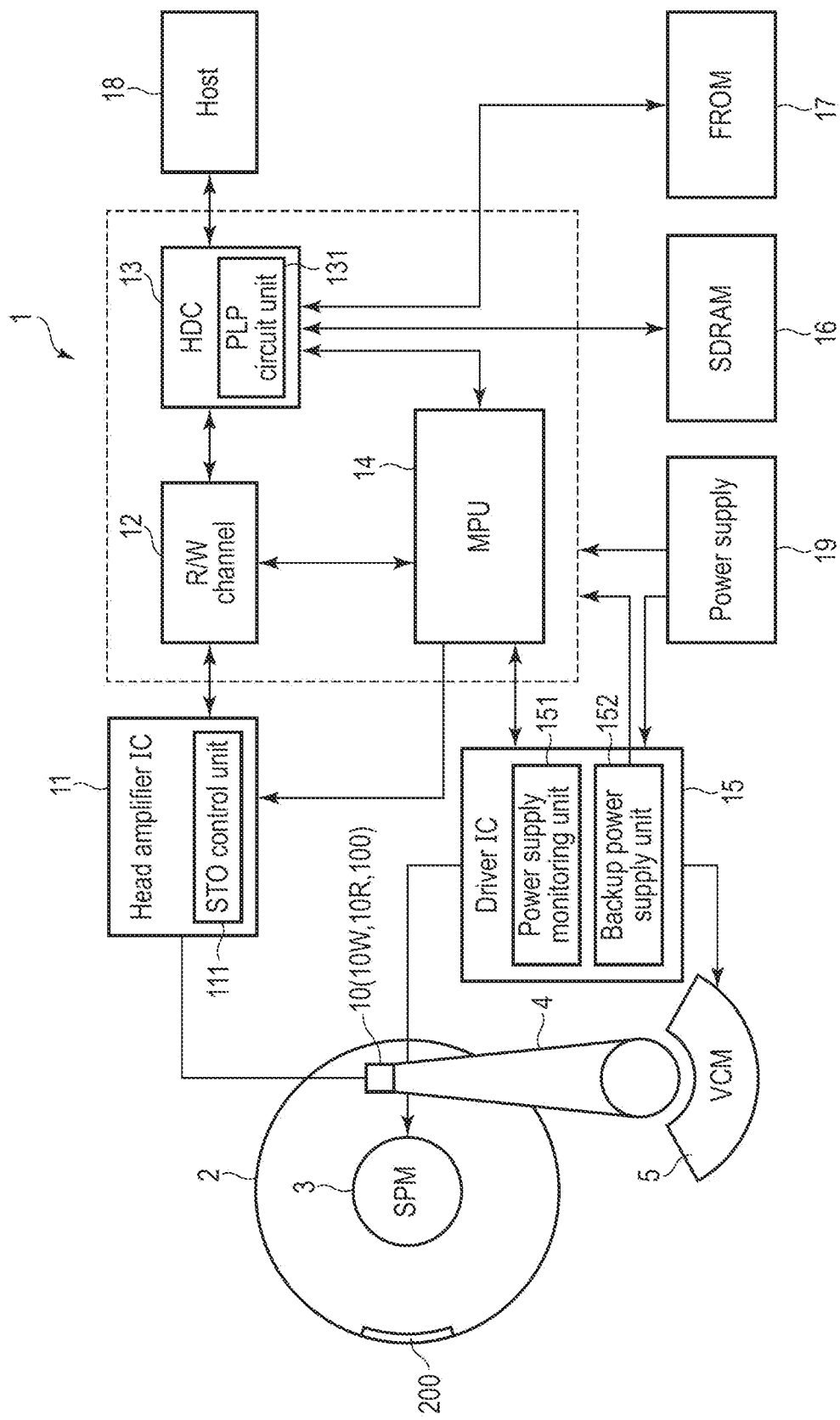
F I G. 1

MAGNETIC DISK DEVICE

CROSS-REFERENCE TO RELATED APPLICATIONS

This application is based upon and claims the benefit of priority from Japanese Patent Application No. 2021-152214, filed Sep. 17, 2021, the entire contents of which are incorporated herein by reference.

FIELD

Embodiments described herein relate generally to a magnetic disk device.

BACKGROUND

There is a case where power supply is temporarily disconnected during operation of the magnetic disk device. In such a case, because data stored in a volatile memory is lost, processing of backing up the data stored in the volatile memory to the non-volatile memory is performed.

When the above-described data is backed up, power is supplied from a backup power supply, but because the power is concentrated on the backup processing, processing or the like responding to a host is not performed. Specifically, the magnetic disk device performs processing such as stopping clock supply or reducing a frequency of a circuit block not used for data backup, and invalidates the host interface to reduce power during the data backup operation as much as possible. Therefore, when the power is restored during the data backup operation, because the host interface does not operate, a phenomenon occurs in which the host cannot recognize the magnetic disk device, causing the host to timeout and disconnect the magnetic disk device. That is, even if the power supply of the magnetic disk device is restored after a temporary power failure, a situation in which the host cannot recognize the Magnetic disk device may occur.

An object of the present invention is to provide a magnetic disk device in which reliability and availability of connection with a host are improved.

BRIEF DESCRIPTION OF THE DRAWINGS

FIG. 1 is a diagram illustrating an example of a configuration of a magnetic device according to an embodiment.

DETAILED DESCRIPTION

Figure 2:
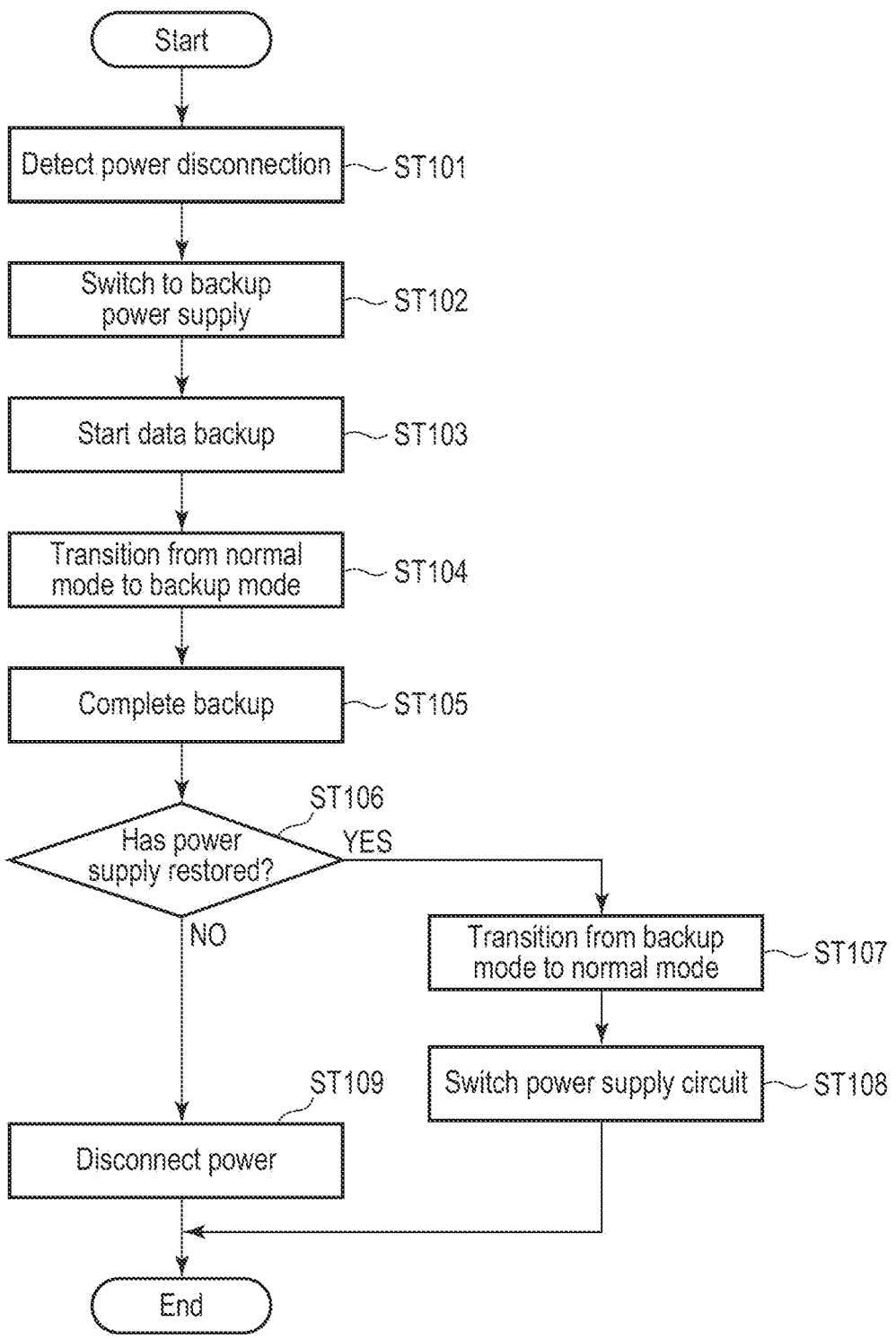
FIG. 2 is a flowchart illustrating an example of processing executed by a control unit when a power supply according to the embodiment is disconnected.

Embodiments will be described hereinafter with reference to the accompanying drawings.

In general, according to one embodiment, a magnetic disk device includes a first power supply to supply power for driving, a magnetic disk, a magnetic head that reads/writes data from/to the magnetic disk, a communication unit that is communicable with a host computer and transmits a first signal to the host computer at a first interval, a power supply monitor that monitors a state of the first power supply, a volatile memory that stores data related to read/write processing on the magnetic disk by the magnetic head, a non-volatile memory, and a controller that controls the communication unit to start processing of backing up the data stored in the volatile memory to the non-volatile memory and transmit the first signal at a second interval longer than the first interval if power supplied from the first power supply is detected to be disconnected based on monitoring of the power supply monitor.

It is noted that the disclosure is presented by way of example only, and those skilled in the art should understand that matters which can be changed as appropriate without departing from the spirit of the disclosure and which could easily be conceived of naturally fall within the scope of the present disclosure. Further, for clarity of explanation, the drawings may be schematically illustrated in width, thickness, shapes, and the like of components, as compared with actual implementation. However, the drawings are presented by way of example only and are not intended to limit understanding of the present disclosure. Furthermore, in the specification and the drawings, elements similar to those already described with reference to the drawings are denoted by the same reference signs, and detailed description thereof is omitted as appropriate.

Embodiment

FIG. 1 is a diagram illustrating an example of a configuration of a magnetic disk device according to a first embodiment.

As illustrated in FIG. 1, a magnetic disk device 1 is configured as, for example, a hard disk drive (HDD), and includes a magnetic disk 2, a spindle motor (SPM) 3, an actuator 4, a voice coil motor (VCM) 5, a magnetic head 10, a head amplifier IC 11, an read/write (R/W) channel 12, a hard disk controller (HDC) 13, a microprocessor (MPU: control unit) 14, a driver IC 15, a synchronous dynamic random access memory (SDRAM) 16, a flash read only memory (FROM) 17, and a power supply (first power supply) 19. In addition, the magnetic disk device 1 can be connected to a host computer (host) 18. The magnetic head 10 includes a write head 10W, a read head 10R, and a spin-torque-oscillator (STO) 100 which is a high-frequency oscillator. Note that the R/W channel 12, the HDC 13, and the MPU 14 may be incorporated in a one-chip integrated circuit.

The magnetic disk 2 includes, for example, a substrate formed in a disk shape and made of a non-magnetic body. On each surface of the substrate, a soft magnetic layer made of material exhibiting soft magnetic characteristics as an underlayer, a magnetic recording layer having magnetic anisotropy in a direction perpendicular to the disk surface on an upper layer portion of the soft magnetic layer, and a protective film layer on an upper layer portion of the magnetic recording layer, are laminated in the described order. Here, a direction of the magnetic head 10 is defined as an upper layer.

The magnetic disk 2 is fixed to the SPM 3 and rotated at a predetermined speed by the SPM 3. Note that the number of magnetic disks 2 is not limited to one, and a plurality of the magnetic disks 2 may be installed in the SPM 3. The SPM 3 is driven by a drive current (or a drive voltage) supplied from the driver IC 15. In the magnetic disk 2, a data pattern is recorded and read by the magnetic head 10. The magnetic disk 2 includes a monitoring area 200. The monitoring area 200 is an area for storing information regarding data read/write. The monitoring area 200 is provided, for example, on a part of the outermost circumference or the innermost circumference in the radial direction of the magnetic disk 2.

The actuator 4 is rotatably installed and supports a magnetic head 10 at a tip portion thereof. By rotating the actuator 4 by the VCM 5, the magnetic head 10 is moved and positioned on a desired track of the magnetic disk 2. The VCM 5 is driven by a drive current (or a drive voltage) supplied from the driver IC 15.

The magnetic head 10 includes a slider, and the write head 10W, the read head 10R, and the STO 100 which are formed on the slider. A plurality of the magnetic heads 10 is provided according to the number of the magnetic disks 2.

The head amplifier IC 11 includes a circuit related to driving of the STO 100, detection of oscillation characteristics, and the like. For example, the head amplifier IC 11 includes an STO control unit 111. The head amplifier IC 11 executes driving of the STO 100, detection of drive signals, and the like. Further, the head amplifier IC 11 supplies a write signal (write current) corresponding to the write data supplied from the R/W channel 12 to the write magnetic head 10W. In addition, the head amplifier IC 11 amplifies a read signal output from the read magnetic head 10R and transmits the amplified read signal to the R/W channel 12.

The STO control unit 111 controls the current flowing to the STO 100 of the write head 10W. Note that the head amplifier IC 11 further includes a recording coil control unit that controls a recording current to be supplied to the coil of the write head 10W according to the write signal, a reproduction signal detection unit that detects a signal (read data) reproduced by the read head 10R, and a heater control unit that controls power supply to the heater that adjusts the distance between the magnetic disk 2 and the magnetic head 10.

The R/W channel 12 is a signal processing circuit that processes signals related to reading/writing. The R/W channel 12 includes a read channel for executing signal processing of read data and a write channel for executing signal processing of write data. The R/W channel 12 converts the read signal into digital data and demodulates the read data from the digital data. The R/W channel 12 encodes the write data transferred from the HDC 13 and transfers the encoded write data to the head amplifier IC 11.

The HDC 13 controls writing of data to the magnetic disk 2 and reading of data from the magnetic disk 2 via the magnetic head 10, the head amplifier IC 11, the R/W channel 12, and the MPU 14. The HDC 13 configures an interface between the magnetic disk device 1 and the host 18, and executes transfer control of read data and write data. Note that connection with the host 18 is assumed to be made according to the standard of Serial Attached Small Computer System Interface (Serial Attached SCSI or SAS) or Serial Advanced Technology Attachment (Serial ATA or SATA), but is not limited thereto. In addition, the HDC 13 receives a command (write command, read command, etc.) transferred from the host 17 and transmits the received command to the MPU 14.

Further, the hard disk controller 13 includes a power loss protection circuit unit (hereinafter, referred to as a "PLP circuit unit") 131 which is a communication unit. The PLP circuit unit 131 is a circuit that backs up data when the power supply is disconnected. Note that, in the present embodiment, the disconnection of the power supply refers to a state in which power is no longer supplied from the power supply 19 to the magnetic disk device 1. More specifically, the disconnection of the power supply means that the current does not flow from the power supply 19 to the magnetic disk device 1, and the operation of the magnetic disk device 1 stops if there is no power supplied from a backup power supply unit 152 described later. In addition, the PLP circuit unit 131 transmits, to the host 18, a first signal which is a signal indicating that the magnetic disk device 1 is normally connected. In the present embodiment, the first signal is COMINIT signal, and the COMINIT signal is, for example, a burst signal that continues a predetermined number of times. Further, in the present embodiment, the PLP circuit unit 131 has a normal mode in which the COMINIT signal is transmitted at a first interval and a backup mode in which the COMINIT signal is transmitted at a second interval longer than the first interval. If the host 18 does not detect the COMINIT signal for a certain period of time, connection with the host is timed out and the host 18 cannot recognize the magnetic disk device 1. Therefore, the second interval is set to be shorter than the time until the host 18 determines a timeout. The host 18 can recognize that the magnetic disk device 1 is communicably connected thereto by detecting the COMINIT signal transmitted from the magnetic disk device 1 at predetermined intervals. In the case where the magnetic disk device 1 is recognized by the host 18 in this manner, when a user operates the host 18 to open a predetermined screen, the presence of the magnetic disk device 1 is displayed on the screen.

The MPU 14 is a main controller of the magnetic disk device 1, and executes servo control necessary for control of read/write operation and positioning of the magnetic head 10.

The driver IC 15 controls driving of the SPM 3 and the VCM 5 according to control of the MPU 14. When the VCM 5 is driven, the magnetic head 10 is positioned at a target track on the magnetic disk 2.

The driver IC 15 includes a power supply monitoring unit 151 and the backup power supply unit (second power supply) 152. The power supply monitoring unit 151 monitors the state of the power supply 19. More specifically, the power supply monitoring unit 151 monitors whether the power is applied from the power supply 19 to the magnetic disk device 1. In addition, the power supply monitoring unit 151 transmits the monitoring result to the MPU 14. In the present embodiment, the power supply monitoring unit 151 transmits a fault signal to the MPU 14 when the power supply 19 is disconnected. When the power supply 19 is disconnected, the backup power supply unit 152 supplies power for executing processing of backing up data stored in the SDRAM 16 to the FROM 17. In the present embodiment, in order to continue the rotation of the SPM 3 for a certain period of time even when the power supply 19 is disconnected, the power of the backup power supply unit 152 is generated using the counter electromotive force of the SPM 3, and the power supply for the backup processing is secured. The backup power supply unit 152 is not limited to the one that uses the counter electromotive force of the SPM 3, and for example, a backup power supply device may be provided separately from the power supply 19.

The SDRAM 16 is a volatile memory. The SDRAM 16 holds, for example, data when the MPU 14 executes processing. Because the SCRAM 16 is volatile, the held data is lost when power is not supplied from the power supply 19. On the other hand, the FROM 17 is a non-volatile memory. The FROM 17 stores programs, parameters, and others necessary for processing of the MPU 14. When the power supply 19 is disconnected, backup data of the SDRAM 16 is stored in the FROM 17. The backup data stored in the FROM 17 is written back to the SDRAM 16 after the power supply 19 is restored. The power supply 19 is a power supply device of the magnetic disk device 1 and supplies power to each unit in the magnetic disk device 1.

Next, processing at the time of power disconnection is described. FIG. 2 is a flowchart illustrating an example of processing executed by the MPU 14 when the power supply 19 is disconnected.

The MPU 14 detects power disconnection (ST101). More specifically, the MPU 14 detects the power disconnection based on the power supply monitoring state of the power supply monitoring unit 151. Specifically, the MPU 14 detects whether or not the power supply 19 is in a power disconnected state based on whether or not a fault signal is received from the power supply monitoring unit 151.

When the power disconnection is detected (ST101), the MPU 14 switches to the backup power supply (ST102). Because the power is not supplied from the power supply 19, the MPU 14 operates the backup power supply unit 152. Therefore, the backup power based on the counter electromotive force of the SPM 3 is supplied to the magnetic disk device 1. Therefore, even in the power disconnected state, data can be backed up.

Next, the MPU 14 starts data backup (ST103). That is, the MPU 14 starts the processing of backing up the data held in the SDRAM 16 to the FROM 17.

Next, the MPU 14 causes the magnetic disk device 1 to transition from the normal mode to the backup mode (ST104). More specifically, the MPU 14 controls the PLP circuit unit 131 to change the transmission interval of the COMINIT signal transmitted from the PIP circuit unit 131 to the host 18 from the first interval to the second interval. Note that the backup power supply of the backup power supply unit 152 is not used other than the processing used for data backup and the processing in which the PLP circuit unit 131 transmits the COMINIT signal. As a result, the power consumption of the backup power supply can be suppressed. In addition, because the COMINIT signal is transmitted at the second interval longer than the first interval, the power consumption of the backup power supply can be suppressed as compared with the case where the COMINIT signal is transmitted at the first interval.

Then, when the data backup is completed (ST105), the MPU 14 determines whether the power supply 19 has been restored (ST106). Specifically, as in step ST101 described above, the MPU 14 determines whether or not the power supply 19 has been restored based on whether or not the fault signal is received from the power supply monitoring unit 151. If no fault signal is detected, the power supply 19 is determined to have been restored, and if the fault signal is detected, the power supply 19 is determined not to have been restored.

If the power supply 19 is determined to have been restored (ST106: YES), the MPU 14 causes the magnetic disk device 1 to transition from the backup mode to the normal mode (ST107). Then, the MPU 14 switches the power supply circuit (ST108). That is, the power supply from the backup power supply unit 152 is switched to the power supply from the power supply 19. As a result, the magnetic disk device 1 returns to the normal operation. Therefore, because the reset is not performed, the backup data is not written back to the SDRAM 16, and the magnetic disk device 1 can be restored quickly. On the other hand, when the power supply 19 is determined not to have been restored (ST106: NO), the MPU 14 ends the processing while keeping the power disconnected. That is, the operation of the magnetic disk device 1 stops.

According to the magnetic disk device 1 configured as described above, when the disconnection of the power supply 19 is detected based on the monitoring result of the power supply 19 of the power supply monitoring unit 151, the MPU 14 starts the processing of backing up the data stored in the SDRAM 17 to the FROM 17, controls the PLP circuit 131, and transmits the COMINIT signal transmitted from the PLP circuit 131 at the second interval longer than the first interval. That is, after detecting the fault signal, the magnetic disk device 1 immediately switches the power supply from the power supply 19 to the backup power supply unit 152 to start the backup operation of the data, and the PLP circuit unit 131 transmits the COMINIT signal to the host 18 at the second interval until the backup processing is completed. As a result, the magnetic disk device 1 can be prevented from being unrecognizable from the host 18. In addition, at this time, because the HDC 13 stops processing such as processing of receiving a command from the host 18, which is the processing other than the processing used for data backup and the processing in which the PLP circuit unit 131 transmits the COMINIT signal, the power consumption of the backup power supply can be suppressed.

Further, the magnetic disk device 1 determines whether the power supply 19 has been restored when the processing of backing up the data from the SDRAM 16 to the FROM 17 is completed, and switches the power supply from the backup power supply unit 152 to the power supply 19 when the power supply is determined to have been restored. Therefore, when the magnetic disk device 1 is restored from the instantaneous stop, the magnetic disk device 1 does not need to write data back to the SDRAM 16, and can be restored quickly. Note that the instantaneous stop means a state in which the power is temporarily cut due to some circumstances, and is distinguished from a state in which the power supply 19 of the magnetic disk device 1 is disconnected in response to an instruction from the user to disconnect the power supply.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a first power supply to supply power for driving;
   a magnetic disk;
   a magnetic head that reads/writes data from/to the magnetic disk;
   a communication unit that is communicable with a host computer and transmits a first signal to the host computer at a first interval;
   a power supply monitor that monitors a state of the first power supply;
   a volatile memory that stores data related to read/write processing on the magnetic disk by the magnetic head;
   a non-volatile memory; and
   a controller that controls the communication unit to start processing of backing up the data stored in the volatile memory to the non-volatile memory and transmit the first signal at a second interval longer than the first interval if power supplied from the first power supply is detected to be disconnected based on monitoring of the power supply monitor.

2. The magnetic disk device according to claim 1, wherein the second interval defines a time that is shorter than a time in which the host computer determines a timeout regarding connection with the magnetic disk device.

3. The magnetic disk device according to claim 1, wherein the controller transmits the first signal at the second interval until the processing of backing up the data is completed.

4. The magnetic disk device according to claim 1, wherein, if the first power supply is determined to be restored based on a monitoring result of the power supply monitor when the processing of backing up the data is completed, the controller controls the communication unit to change the second interval to the first interval and transmit the first signal at the first interval.

5. The magnetic disk device according to claim 1, wherein the first signal is a signal indicating that the magnetic disk device is normally connected to the host computer.

6. The magnetic disk device according to claim 1, further comprising a second power supply to supply power for driving, wherein
if the controller detects that the power supplied from the first power supply is in a disconnected state, the controller operates based on power supplied from the second power supply.

7. The magnetic disk device according to claim 6, wherein, if the first power supply is determined to be restored based on a monitoring result of the power supply monitor when the processing of backing up the data is completed, the controller switches the power supplied from the second power supply to the power supplied from the first power supply and operates based on the power supplied from the first power supply.

8. The magnetic disk device according to claim 6, further comprising a spindle motor that rotates the magnetic disk, wherein
the power of the second power supply is generated from a counter electromotive force of the spindle motor.

9. The magnetic disk device according to claim 8, wherein, if the power supplied from the first power supply is determined to be in the disconnected state based on the monitoring of the power supply monitor, the power supplied from the second power supply is used for the processing of backing up the data and processing of transmitting the first signal at the second interval.

10. A magnetic disk device comprising:
a magnetic disk;
a magnetic head that reads/writes data from/to the magnetic disk;
a communication unit that is communicable with a host computer and transmits a first signal to the host computer at a first interval;
a volatile memory that stores data related to read/write processing on the magnetic disk by the magnetic head;
a non-volatile memory; and
a controller that controls the communication unit to write at least a part of the data stored in the volatile memory in the non-volatile memory and transmit the first signal at a second interval longer than the first interval when a power supply for driving is in a disconnected state.

* * * * *